(12) United States Patent
Imai

(10) Patent No.: US 12,136,955 B2
(45) Date of Patent: Nov. 5, 2024

(54) MOBILE OBJECT, COMPUTER-READABLE MEDIUM, AND CONTROL METHOD

(71) Applicant: SoftBank Corp., Tokyo (JP)

(72) Inventor: Hiromichi Imai, Tokyo (JP)

(73) Assignee: SoftBank Corp., Tokyo (JP)

( * ) Notice: Subject to any disclaimer, the term of this patent is extended or adjusted under 35 U.S.C. 154(b) by 283 days.

(21) Appl. No.: 17/684,428

(22) Filed: Mar. 2, 2022

(65) Prior Publication Data

US 2022/0190934 A1 Jun. 16, 2022

Related U.S. Application Data

(63) Continuation of application No. PCT/JP2020/002787, filed on Jan. 27, 2020.

(30) Foreign Application Priority Data

Sep. 20, 2019 (JP) ................. 2019-171767

(51) Int. Cl.
*H04B 10/80* (2013.01)
*B63B 79/15* (2020.01)
(Continued)

(52) U.S. Cl.
CPC ............ *H04B 10/80* (2013.01); *B63B 79/15* (2020.01); *B64C 39/024* (2013.01); *G01C 19/00* (2013.01);
(Continued)

(58) Field of Classification Search
None
See application file for complete search history.

(56) References Cited

U.S. PATENT DOCUMENTS 8,682,726 B2  3/2014  Hoffberg
10,985,839 B2  4/2021  Tanaka
(Continued)

FOREIGN PATENT DOCUMENTS

CN  101651496 A  2/2010
CN  105075421 A  11/2015
(Continued)

OTHER PUBLICATIONS (ISA/237) Written Opinion of the International Search Authority for International Patent Application No. PCT/JP2020/002787, issued/mailed by the Japan Patent Office on Mar. 3, 2020.
(Continued)

*Primary Examiner* — David W Lambert

(57) ABSTRACT

Provided is a mobile object including: a mobile object information transmitting unit configured to transmit, to another mobile object by optical wireless communication by a first optical wireless communication unit, first mobile object information including first inertial measurement information and first body control information; a mobile object information receiving unit configured to receive, from the another mobile object by optical wireless communication by the first optical wireless communication unit, second mobile object information including second inertial measurement information and second body control information; and an optical axis direction control unit configured to control a direction of an optical axis of the first optical wireless communication unit on a basis of the first mobile object information and the second mobile object information.

20 Claims, 11 Drawing Sheets

(51) Int. Cl.
    *B64C 39/02*    (2023.01)
    *G01C 19/00*    (2013.01)
    *G01P 15/08*    (2006.01)
    *G01P 15/18*    (2013.01)
    *G01S 19/01*    (2010.01)
    *G05D 1/00*     (2006.01)
    *H04B 10/11*    (2013.01)
    *G06V 20/40*    (2022.01)

(52) U.S. Cl.
    CPC .............. *G01P 15/08* (2013.01); *G01P 15/18* (2013.01); *G01S 19/01* (2013.01); *G05D 1/0206* (2013.01); *G05D 1/106* (2019.05); *H04B 10/11* (2013.01); *B63B 2201/00* (2013.01); *B63B 2203/00* (2013.01); *B63B 2213/02* (2013.01); *G06V 20/40* (2022.01)

(56) References Cited

U.S. PATENT DOCUMENTS

| | | | |
|---|---|---|---|
| 11,044,012 | B2 | 6/2021 | Watanabe |
| 2009/0073175 | A1* | 3/2009 | Matsumoto .............. G09G 5/26 345/467 |
| 2013/0177322 | A1 | 7/2013 | Devaul |
| 2015/0188628 | A1* | 7/2015 | Chalfant, III ........ H04B 10/112 398/131 |
| 2019/0253142 | A1* | 8/2019 | Griffith ................ G02B 26/127 |
| 2020/0295831 | A1* | 9/2020 | Watanabe ............ H04B 10/112 |

FOREIGN PATENT DOCUMENTS

| | | | |
|---|---|---|---|
| EP | 2964007 | A1 | 1/2016 |
| JP | 2001044941 | A | 2/2001 |
| JP | 2009055408 | A | 3/2009 |
| JP | 2018166256 | A | 10/2018 |
| JP | 2019022070 | A | 2/2019 |
| RU | 2108565 | C1 | 4/1998 |
| RU | 2452978 | C1 | 6/2012 |
| RU | 2686456 | C1 | 4/2019 |
| WO | 2014112064 | A1 | 7/2014 |
| WO | WO-2017169911 | A1 * | 10/2017 ........... H04B 10/112 |

OTHER PUBLICATIONS

Office Action issued for counterpart Japanese Application No. 2019-171767, issued by the Japan Patent Office on Feb. 18, 2020 (drafted on Jan. 30, 2020).

Office Action issued for counterpart Japanese Application No. 2019-171767, issued by the Japan Patent Office on Jul. 7, 2020 (drafted on Jul. 3, 2020).

Office Action issued for counterpart Russian Application 2022106768, issued by the Russian Intellectual Property Office on Oct. 4, 2022.

Office Action issued for counterpart Chinese Application 202080063664.6, issued by The State Intellectual Property Office of People's Republic of China on Dec. 19, 2023.

* cited by examiner

MOBILE OBJECT, COMPUTER-READABLE MEDIUM, AND CONTROL METHOD

The contents of the following Japanese patent application(s) are incorporated herein by reference:
NO. 2019-171767 filed in JP on Sep. 20, 2019
NO. PCT/JP2020/002787 filed in WO on Jan. 27, 2020

BACKGROUND

1. Technical Field

The present invention relates to a mobile object, a computer-readable medium, and a control method.

2. Related Art

A mobile object equipped with an optical wireless communication function has been known (for example, see Patent Document 1).

PRIOR ART DOCUMENT

Patent Document

[Patent Document 1] Japanese Unexamined Patent Publication No. 2018-166256

Technical Problem

It is desirable to provide technology that supports the stable execution of optical wireless communication.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
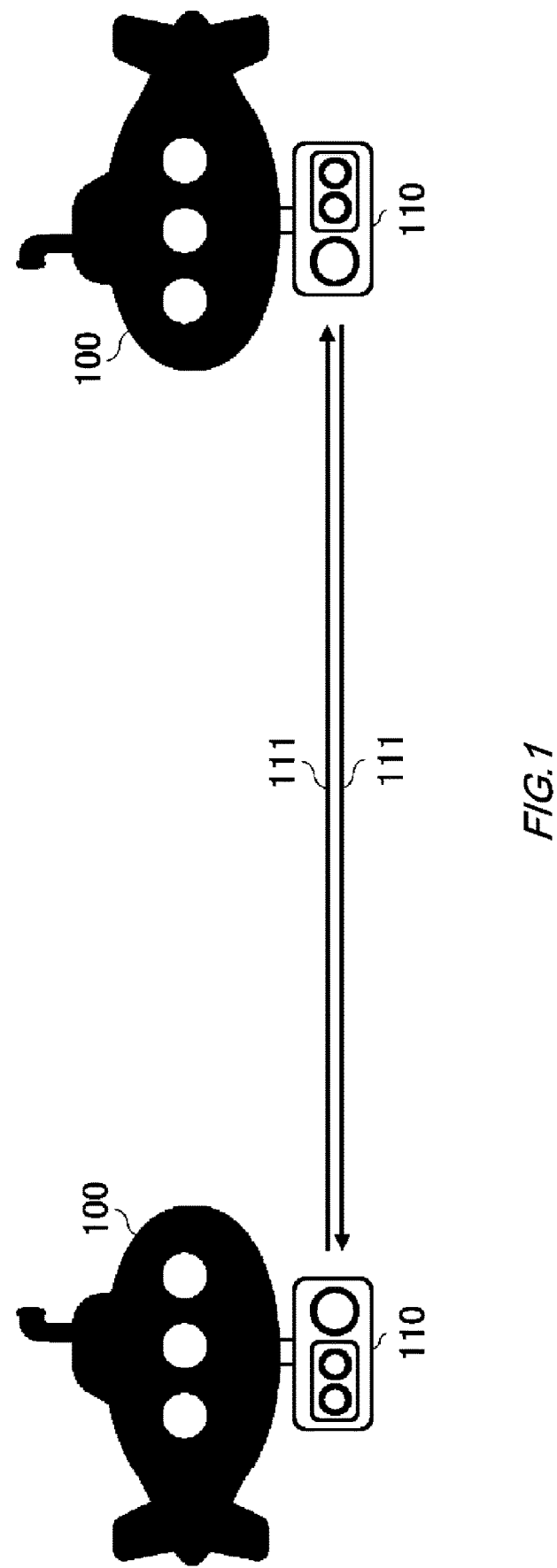
FIG. 1 schematically illustrates an example of a submersible vehicle 100.

FIG. 1 schematically illustrates an example of a submersible vehicle 100. The submersible vehicle 100 may be an example of a mobile object. The submersible vehicle 100 is provided with an optical wireless communication apparatus 110. In the example illustrated in FIG. 1, the optical wireless communication apparatus 110 is fixed so as not to move relative to the submersible vehicle 100. The submersible vehicle 100 can execute optical wireless communication with another submersible vehicle 100 by optical wireless communication by the optical wireless communication apparatus 110.

The submersible vehicle 100 according to the present embodiment shares mobile object information including inertial measurement information and body control information with another submersible vehicle 100, and controls the direction of the optical wireless communication apparatus 110 of the own machine such that the alignment of the optical axis of the optical wireless communication apparatus 110 and the optical axis of the optical wireless communication apparatus 110 included in the other submersible vehicle 100 is maintained on the basis of the mobile object information.

The inertial measurement information may indicate measurement results of the three-dimensional angular velocity and acceleration of the submersible vehicle 100. The submersible vehicle 100 may include, for example, inertial measurement information indicating measurement results measured by an inertial measurement apparatus (IMU (Inertial Measurement Unit)) included in the submersible vehicle 100 in the mobile object information.

The body control information may be information used by the propulsion apparatus included in the submersible vehicle 100. The propulsion apparatus propels the submersible vehicle 100 according to the body control information. The submersible vehicle 100 may include the body control information used by the propulsion apparatus in the mobile object information.

For example, the submersible vehicle 100 first aligns the optical axis of the optical wireless communication apparatus 110 with the other submersible vehicle 100 by an arbitrary method to establish an optical wireless communication link. Any method may be used for aligning the optical axes.

For example, the user of a first submersible vehicle 100 and the user of a second submersible vehicle 100 dispose the first submersible vehicle 100 and the second submersible vehicle 100 such that the optical axes of the optical wireless communication apparatuses 110 are aligned with each other. In addition, for example, the first submersible vehicle 100 and the second submersible vehicle 100 automatically align the optical axes of the optical wireless communication apparatuses 110 by sharing each other's positions and the like under the water by acoustic communication. In addition, for example, the first submersible vehicle 100 and the second submersible vehicle 100 located on the water automatically align the optical axes of the optical wireless communication apparatuses 110 by sharing each other's positions and the like by radio communication.

After establishing the optical wireless communication link, the two submersible vehicles 100 share each other's mobile object information. The submersible vehicle 100 can grasp how the other submersible vehicle 100 is trying to move the body by referring to the body control information of the other submersible vehicle 100. In addition, the submersible vehicle 100 can grasp how the other submersible vehicle 100 has moved by referring to the inertial measurement information of the other submersible vehicle 100. By referring to the body control information and the inertial measurement information, the submersible vehicle 100 can grasp how the other submersible vehicle 100 tries to move the body and how it is moving as a result.

Figure 2:
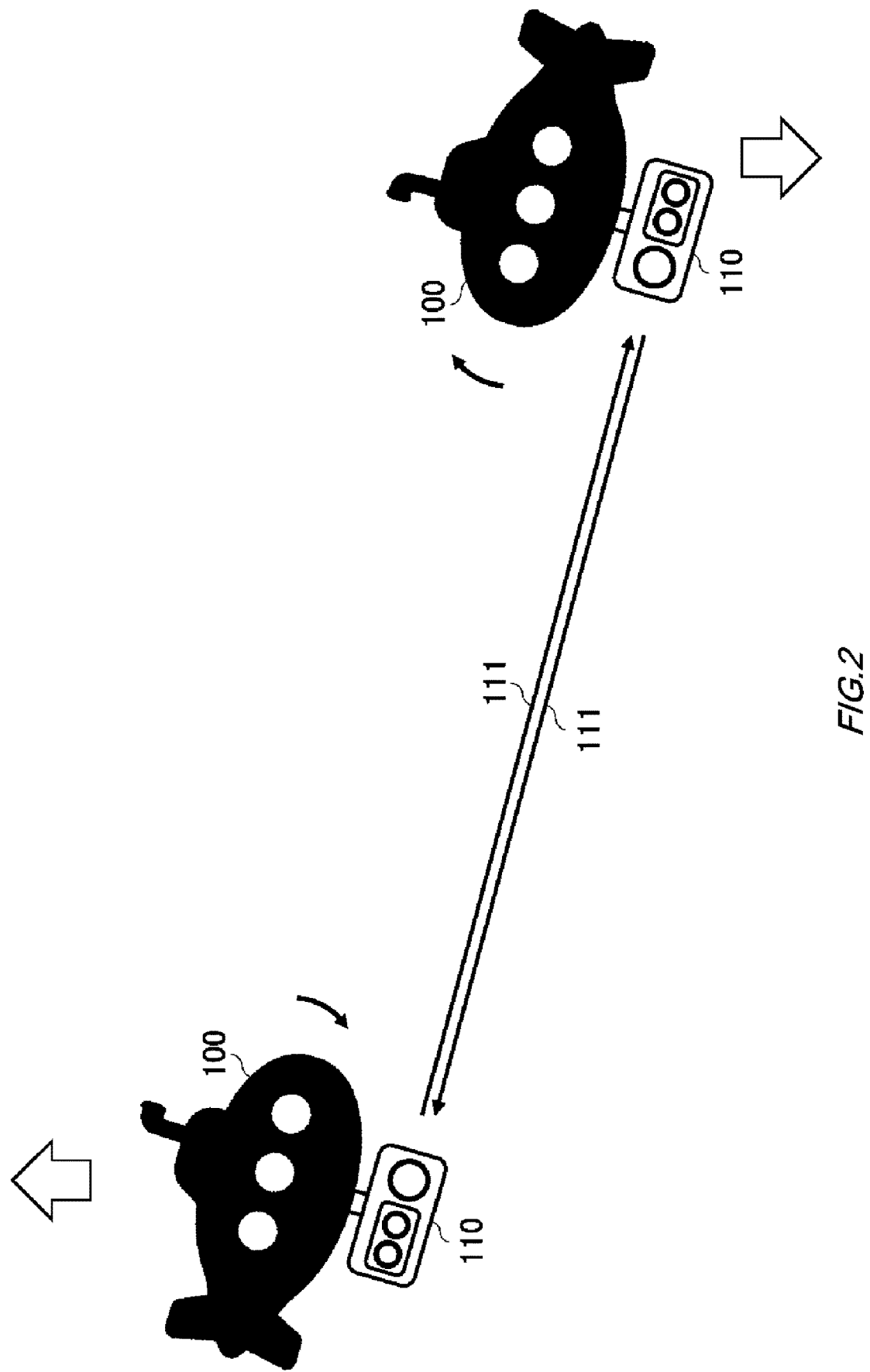
FIG. 2 is an explanatory diagram of control of an optical axis 111 by the submersible vehicle 100.

FIG. 2 is an explanatory diagram of control of the optical axis 111 by the submersible vehicle 100. FIG. 2 illustrates the state of control of the optical axis 111 in a case where the first submersible vehicle 100 goes up and the second submersible vehicle 100 goes down.

The first submersible vehicle 100 and the second submersible vehicle 100 each grasp that the first submersible vehicle 100 goes up and the second submersible vehicle 100 goes down on the basis of the shared mobile object information. The first submersible vehicle 100 controls the propulsion apparatus of the first submersible vehicle 100 such that the first submersible vehicle 100 pitches down to make the direction of the optical axis 111 of the first submersible vehicle 100 face the optical wireless communication apparatus 110 of the second submersible vehicle 100 so as to maintain the alignment of the optical axis 111 of the first submersible vehicle 100 and the optical axis 111 of the second submersible vehicle 100. Similarly, the second submersible vehicle 100 controls the propulsion apparatus of the second submersible vehicle 100 such that the second submersible vehicle 100 pitches up to make the direction of the optical axis 111 of the second submersible vehicle 100 face the optical wireless communication apparatus 110 of the first submersible vehicle 100 so as to maintain the alignment of the optical axes 111.

In this way, each of the first submersible vehicle 100 and the second submersible vehicle 100 controls the direction of the optical axis 111 by changing the posture on the basis of the shared mobile object information, so that the alignment of the optical axes 111 can be maintained and the optical wireless communication can be stably executed. In particular, by sharing the body control information, it is possible to cope with the voluntary movement of the submersible vehicle 100, and by sharing the inertial measurement information, it is also possible to cope with the movement of the submersible vehicle 100 due to an external factor.

Figure 3:
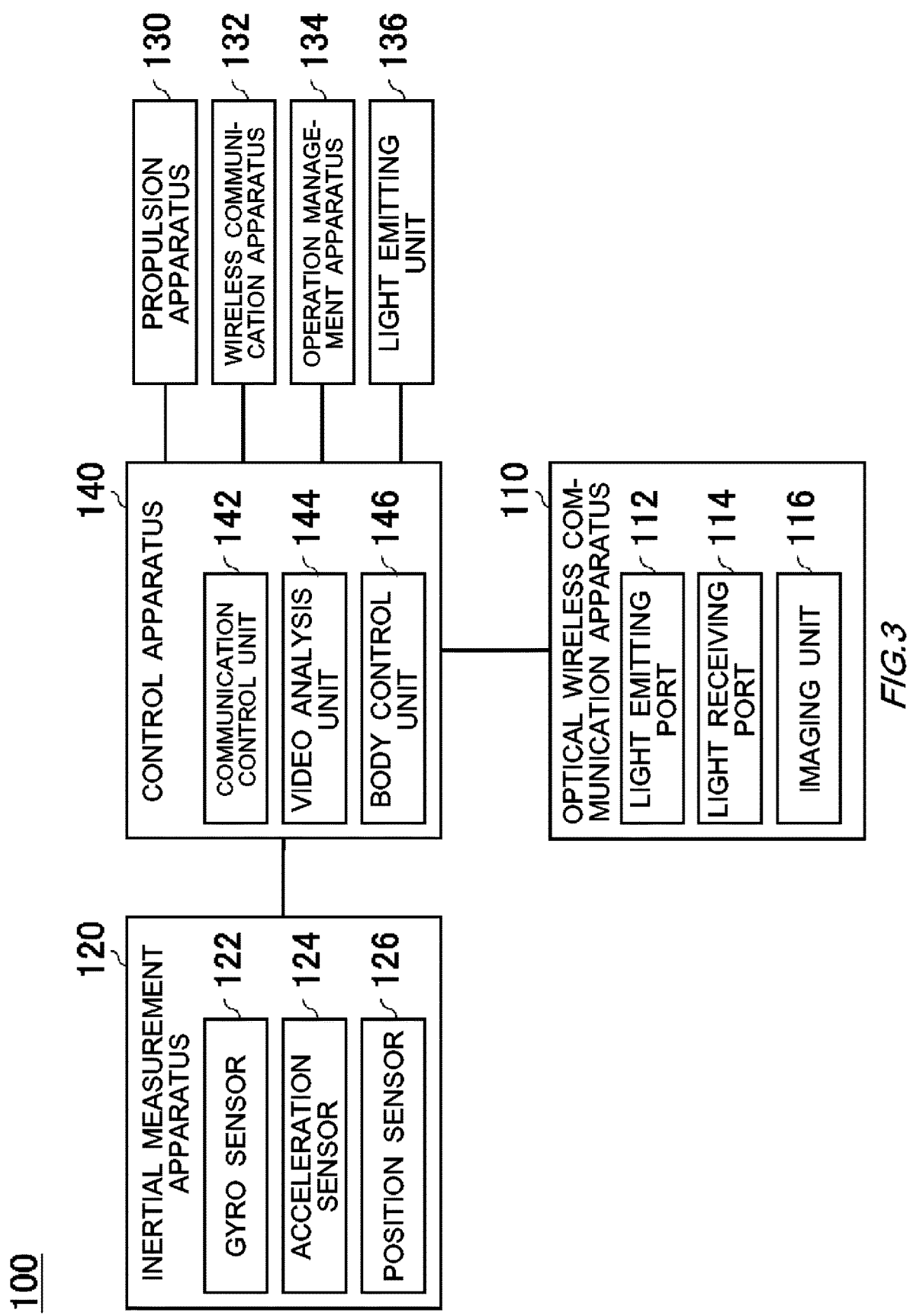
FIG. 3 schematically illustrates an example of the functional configuration of the submersible vehicle 100.

FIG. 3 schematically illustrates an example of the functional configuration of the submersible vehicle 100. The submersible vehicle 100 is provided with the optical wireless communication apparatus 110, an inertial measurement apparatus 120, a propulsion apparatus 130, a wireless communication apparatus 132, an operation management apparatus 134, a light emitting unit 136, and a control apparatus 140. Note that it is not essential that the submersible vehicle 100 is provided with all of these configurations. The submersible vehicle 100 itself may be described as own vehicle, and the other submersible vehicle 100 may be described as other vehicle.

The optical wireless communication apparatus 110 includes a light emitting port 112 and a light receiving port 114. The type of light used for optical wireless communication by the optical wireless communication apparatus 110 may be any kind, and for example, light having a wavelength between infrared rays and visible light is used.

For example, in a case where visible light is used, LEDs (Light Emitting Diodes) of various wavelengths can be obtained at low cost, so that it is possible to easily widen the bandwidth by superimposing multiple wavelengths and reduce the manufacturing cost of the optical wireless communication apparatus 110. In addition, for example, in a case where infrared rays are used, since the wavelength of infrared rays is longer than that of visible light, it is possible to reach a long distance with a small output power. In addition, it is safe for the eyes and invisible to the naked eye, so it is possible to conceal communication.

The optical wireless communication apparatus 110 includes an imaging unit 116. The imaging unit 116 captures an image in the optical wireless communication direction. The imaging unit 116, for example, captures an image in the light emitting direction by the light emitting port 112. The vectors of the optical wireless communication directions of the light emitting port 112 and the light receiving port 114, and the vector of the main imaging direction by the imaging unit 116 may be the same. The main imaging direction by the imaging unit 116 is, for example, the direction of the optical axis of the lens provided in the imaging unit 116. The optical wireless communication apparatus 110 may not include the imaging unit 116.

The inertial measurement apparatus 120 measures the behavior of the body of the own vehicle. The inertial measurement apparatus 120 includes a gyro sensor 122, an acceleration sensor 124, and a position sensor 126. The gyro sensor 122 detects an angular velocity. The acceleration sensor 124 detects an acceleration.

The position sensor 126 measures the position of the own vehicle. The position sensor 126 may be, for example, a GNSS (Global Navigation Satellite System) unit. In this case, the position sensor 126 executes positioning of the own vehicle when the own vehicle is not located under the water.

The position sensor 126 may be an inertial navigation system (INS (registered trademark)). In this case, the position sensor 126 derives the position and the speed of the own vehicle on the basis of the angular velocity and the acceleration measured by the gyro sensor 122 and the acceleration sensor 124. The position sensor 126 may be a Doppler ground speedometer. The position sensor 126 may be any other sensor as long as it can measure the position of the own vehicle. Note that The inertial measurement apparatus 120 may not include the position sensor 126.

The inertial measurement apparatus 120 may include a pressure gauge (not illustrated). The pressure gauge outputs, for example, water pressure information regarding a measured water pressure. In addition, the inertial measurement apparatus 120 may include a flow meter (not illustrated). The flow meter outputs, for example, flow rate information regarding a measured flow rate.

The propulsion apparatus 130 propels the own vehicle. The propulsion apparatus 130 propels the own vehicle by a drive apparatus such as an engine and a motor, a screw propeller, a rudder, and the like.

The wireless communication apparatus 132 communicates wirelessly with the other vehicle in a place other than underwater. The wireless communication apparatus 132 communicates wirelessly with the other vehicle, for example, on the water. The wireless communication apparatus 132 may operate as a sub-communication function until the optical wireless communication link by the optical wireless communication apparatus 110 is established. The own vehicle shares information necessary for aligning the optical axis 111 of the optical wireless communication apparatus 110 with the other vehicle by communicating wirelessly with the other vehicle via the wireless communication apparatus 132. The information necessary for aligning the optical axis 111 is, for example, position information, movement information indicating how to move, and the like.

The submersible vehicle 100 may be provided with an acoustic communication apparatus instead of the wireless communication apparatus 132. For example, the own vehicle may share information necessary for aligning the optical axis 111 of the optical wireless communication apparatus 110 with the other vehicle by communicating wirelessly with the other vehicle via the acoustic communication apparatus. The submersible vehicle 100 may be provided with both the wireless communication apparatus 132 and the acoustic communication apparatus.

The operation management apparatus 134 manages an operation plan of the own vehicle. The operation management apparatus 134 manages, for example, a navigation plan of the own vehicle. The operation management apparatus 134 may manage movement plan information in the navigation plan of the own vehicle, including the movement route of the own vehicle.

The operation management apparatus 134 may acquire the movement plan information from the outside via the wireless communication apparatus 132. The operation management apparatus 134 receives, for example, the movement plan information from a control system of the submersible vehicle 100 and manages the information.

The light emitting unit 136 outputs light having a directivity lower than the directivity of the light output from the light emitting port 112. The light output by the light emitting unit 136 may have a directivity lower than the directivity of the light output from the light emitting port 112, or may be omnidirectional.

The light emitting unit 136 may output visible light. The light emitting unit 136 may output colorless light, or may output colored light. The light emitting unit 136 may output light of multiple colors. The light emitting unit 136 may be, for example, an LED strobe light that outputs light of three colors.

The submersible vehicle 100 may transmit information to the other submersible vehicle 100 by controlling the light emission of the light emitting unit 136. The transmission of information by light emission may be performed by any method. For example, a blinking signal that transmits information depending on the difference in light emitting pattern is used. In addition, the submersible vehicle 100 may acquire the information, which has transmitted by the other submersible vehicle 100 by controlling the light emission of the light emitting unit 136, by analyzing the light emission of the light emitting unit 136 captured by the imaging unit 116.

The submersible vehicle 100 executes communication by the light emitting unit 136 as a communication means until the optical wireless communication link is established with the other submersible vehicle 100, for example. As a specific example, the own vehicle and the other vehicle control the light emission of the light emitting unit 136 to transmit an authentication code, and in a case where it can be determined that the authentication is possible, a process of establishing the optical wireless communication link is executed.

After establishing the optical wireless communication link with the other submersible vehicle 100, the submersible vehicle 100 may execute communication by the light emitting unit 136 as a communication means at the time of communication interruption or unstable communication due to reasons such as optical axis deviation or a distance too far away therebetween. In addition, the submersible vehicle 100 may communicate information regarding the optical wireless communication by the light emitting unit 136 after establishing the optical wireless communication link with the other submersible vehicle 100. For example, the submersible vehicle 100 transmits an error correction signal corresponding to the optical wireless communication by the light emitting unit 136. The application of communication by the light emitting unit 136 is not limited to these, and may be used for any application.

The control apparatus 140 controls each part of the own vehicle. The control apparatus 140 includes a communication control unit 142, a video analysis unit 144, and a body control unit 146.

The communication control unit 142 controls the communication of the own vehicle. The communication control unit 142 may control the optical wireless communication by the optical wireless communication apparatus 110. The communication control unit 142 may transmit and receive arbitrary data to and from the other submersible vehicle 100 by optical wireless communication by the optical wireless communication apparatus 110.

The communication control unit 142 may control the wireless communication by the wireless communication apparatus 132. In a case where the own vehicle is provided with an acoustic communication apparatus, the communication control unit 142 may control the acoustic communication by the acoustic communication apparatus. The communication control unit 142 may control the communication performed by using the light emission of the light emitting unit 136.

The video analysis unit 144 analyzes the image captured by the imaging unit 116. The video analysis unit 144 detects a communication target by, for example, analyzing the image captured by the imaging unit 116. In addition, the video analysis unit 144 provides the communication control unit 142 with the communication content acquired by image analysis on the light emission of the light emitting unit 136 of the other vehicle.

The body control unit 146 controls the body of the own vehicle. The body control unit 146 may control the propulsion of the own vehicle by controlling the propulsion apparatus 130. By controlling the propulsion apparatus 130, for example, the body control unit 146 realizes the movement of the own vehicle, such as moving forward, bending, returning, rotating, and standing still against disturbance.

The body control unit 146 may control the propulsion apparatus 130 in cooperation with the operation management apparatus 134 such that the own vehicle operates according to the operation plan by exchanging information with the operation management apparatus 134. The body control unit 146 may be an example of a movement plan control unit.

The inertial measurement apparatus 120 may measure how the body of the own vehicle has actually moved when the body of the own vehicle has been controlled by the body control unit 146, and feed back to the body control unit 146. The body control unit 146 may correct the control deviation of the body of the own vehicle based on the feedback from the inertial measurement apparatus 120.

The communication control unit 142 transmits the mobile object information (also referred to as own vehicle information) including the inertial measurement information and the body control information of the own vehicle to the other vehicle by optical wireless communication by the optical wireless communication apparatus 110. The communication control unit 142 may be an example of a mobile object information transmitting unit. After establishing the optical wireless communication link with the other vehicle, the communication control unit 142 may transmit the own vehicle information to the other vehicle according to a predetermined timing.

The predetermined timing may be, for example, a periodic timing. In addition, the predetermined timing may be, for example, a timing at which at least any one of the position and the posture of the body of the own vehicle has changed.

The communication control unit 142 receives the mobile object information (also referred to as other vehicle information) including the inertial measurement information and the body control information of the other vehicle of a communication partner from the other vehicle by optical wireless communication by the optical wireless communication apparatus 110. The communication control unit 142 may store a log of the received other vehicle information. The communication control unit 142 may be an example of a mobile object information receiving unit.

The body control unit 146 controls the direction of the optical axis 111 of the optical wireless communication apparatus 110 of the own vehicle on the basis of the own vehicle information and the other vehicle information. The body control unit 146 may control the direction of the optical axis 111 of the optical wireless communication apparatus 110 of the own vehicle such that the alignment of the optical axis 111 of the optical wireless communication apparatus 110 of the own vehicle and the optical axis 111 of the optical wireless communication apparatus 110 of the other vehicle is maintained. The body control unit 146 may control the direction of the optical axis 111 of the optical wireless communication apparatus 110 of the own vehicle by controlling the propulsion apparatus 130. The body control unit 146 may be an example of an optical axis direction control unit.

In a case where the optical axis 111 of the own vehicle and the optical axis 111 of the other vehicle are deviated for some reason and the optical wireless communication link is disconnected, the body control unit 146 may control the body of the own vehicle so as to align the optical axis 111 of the own vehicle and the optical axis 111 of the other vehicle. The body control unit 146 may predict the position and the posture of the other vehicle on the basis of, for example, the log of the other vehicle information stored by the communication control unit 142, and control the body of the own vehicle so as to align the optical axis 111 of the own vehicle and the optical axis 111 of the other vehicle on the basis of the prediction result. In this way, by storing the log of the other vehicle information, it is possible to contribute to early recovery in a case where the optical wireless communication link is disconnected.

The communication control unit 142 may transmit the own vehicle information further including the position information indicating the position of the own vehicle measured by the position sensor 126 to the other vehicle of a communication partner. The communication control unit 142 may receive the other vehicle information further including the position information indicating the position of the other vehicle of a communication partner from the other vehicle. As a result, it is possible to improve the accuracy in specifying each other's positions as compared with the case where only the inertial measurement information and the body control information are used, and it is possible to contribute to the improvement of reliability.

The communication control unit 142 may transmit the own vehicle information further including the movement plan information received from the operation management apparatus 134 of the own vehicle to the other vehicle of a communication partner. The communication control unit 142 may receive the other vehicle information including the movement plan information of the other vehicle of a communication partner from the other vehicle.

While predicting a change in the relative position between the own vehicle and the other vehicle on the basis of the movement plan information of the own vehicle and the movement plan information of the other vehicle and controlling the direction of the optical axis 111 of the optical wireless communication apparatus 110 of the own vehicle on the basis of the prediction result, the body control unit 146 may execute, for example, control of the direction of the optical axis 111 of the optical wireless communication apparatus 110 of the own vehicle, finer than the control of the direction of the optical axis 111 of the optical wireless communication apparatus 110 based on the prediction result, on the basis of the inertial measurement information and the body control information included in the own vehicle information and the inertial measurement information and the body control information included in the other vehicle information. That is, the body control unit 146 executes accurate control on the body of the own machine based on the inertial measurement information and the body control information in addition to controlling the body of the own machine from the movement route of the own vehicle (position at each time) and the movement route of the other vehicle (position at each time) such that the alignment of the directions of each other's optical axes 111 is maintained. As a result, it is possible to correct the low position specifying accuracy due to the movement plan information and the position deviation due to external factors by the inertial measurement information and the body control information, and maintain the alignment of the directions of the optical axes 111 more stably.

In a case where the optical axis 111 of the own vehicle and the optical axis 111 of the other vehicle are deviated for some reason and the optical wireless communication link is disconnected, the body control unit 146 may predict the position and the posture of the other vehicle on the basis of the movement plan information of the other vehicle, and control the body of the own vehicle so as to align the optical axis 111 of the own vehicle and the optical axis 111 of the other vehicle on the basis of the prediction result.

In a case where the inertial measurement apparatus 120 includes a pressure gauge, the communication control unit 142 may transmit the own vehicle information further including the water pressure information regarding the water pressure measured by the pressure gauge to the other vehicle of a communication partner. The communication control unit 142 may receive the other vehicle information including the water pressure information of the other vehicle of a communication partner from the other vehicle. As a result, the accuracy of specifying the position and the posture of the submersible vehicle 100 can be improved as compared with the case where only the inertial measurement information and the body control information are used, and it is possible to contribute to the improvement of reliability.

In a case where the inertial measurement apparatus 120 includes a flow meter, the communication control unit 142 may transmit the own vehicle information further including the flow rate information regarding the flow rate measured by the flow meter to the other vehicle of a communication partner. The communication control unit 142 may receive the other vehicle information including the flow rate information of the other vehicle of a communication partner from the other vehicle. As a result, the accuracy of specifying the position and the posture of the submersible vehicle 100 can be improved as compared with the case where only the inertial measurement information and the body control information are used, and it is possible to contribute to the improvement of reliability.

Figure 4:
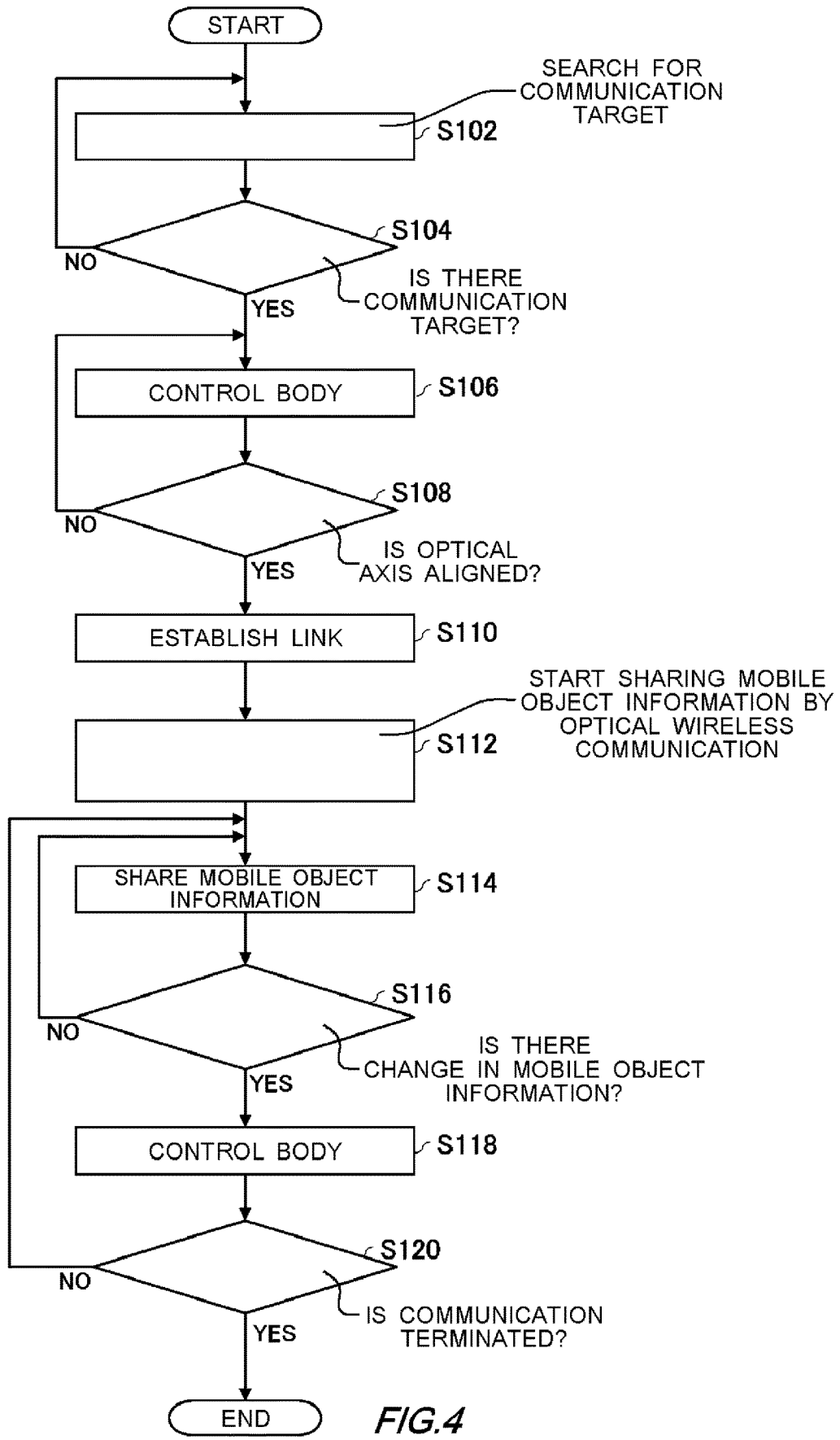
FIG. 4 schematically illustrates an example of a processing flow by the submersible vehicle 100.

FIG. 4 schematically illustrates an example of a processing flow by the submersible vehicle 100. Here, a processing flow in which the submersible vehicle 100 searches for another submersible vehicle 100 to be communicated and executes optical wireless communication with the other submersible vehicle 100 will be described.

In Step 102 (Step may be abbreviated as S), the control apparatus 140 searches fora submersible vehicle 100 to be communicated. The control apparatus 140 may search for a submersible vehicle 100 to be communicated on the basis of the analysis result of the video analysis unit 144. In a case where there is no communication target (NO in S104), the process returns to S102, and in a case where there is a communication target (YES in S104), the process proceeds to S106.

In S106, the body control unit 146 controls the body of the own machine such that the optical axis 111 of the own vehicle and the optical axis 111 of the other vehicle to be communicated are aligned. In a case where the optical axis 111 of the own vehicle and the optical axis 111 of the other vehicle are not aligned (NO in S108), the process returns to S106, and in a case where both are aligned (YES in S108), the process proceeds to S110.

In S110, the communication control unit 142 establishes the optical wireless communication link with the other vehicle. In S112, the communication control unit 142 starts sharing mobile object information with the other vehicle by optical wireless communication.

In S114, the communication control unit 142 shares the mobile object information. The communication control unit 142 transmits the own machine information to the other vehicle by optical wireless communication, and also receives the other vehicle information from the other vehicle. In S116, the body control unit 146 determines whether there has been a change in the mobile object information. In a case where it is determined that there is no change, the process returns to S114, and in a case where it is determined that there is a change, the process proceeds to S118.

In S118, the body control unit 146 controls the body of the own vehicle in order to maintain the alignment of the optical axis 111 of the own vehicle and the optical axis 111 of the other vehicle on the basis of the own vehicle information and the other vehicle information. In S120, the communication control unit 142 determines whether to terminate the optical wireless communication with the other vehicle. In a case where it is determined not to terminate, the process returns to S114, and in a case where it is determined to terminate, the process is terminated.

In the above embodiment, the submersible vehicle 100 has been given as an example of the mobile object, but the present invention is not limited to this. Other examples of the mobile object include unmanned aerial vehicles such as drones and flying objects such as helicopters. In addition, as another example of the mobile object, an automobile, a ship, and the like can be exemplified.

Figure 5:
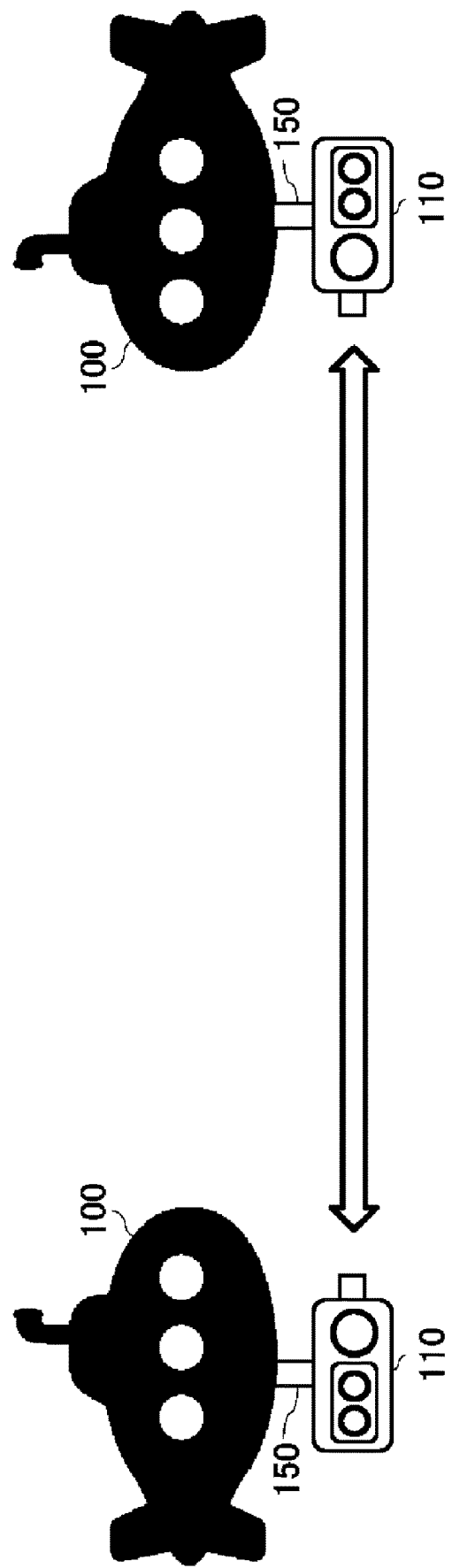
FIG. 5 schematically illustrates another example of the submersible vehicle 100.

FIG. 5 schematically illustrates another example of the submersible vehicle 100. Here, the points different from those in FIG. 1 will be mainly described. In the example illustrated in FIG. 5, the submersible vehicle 100 is provided with a gimbal 150 that rotatably supports the optical wireless communication apparatus 110. The submersible vehicle 100 controls the gimbal 150 to adjust the angle of the optical wireless communication apparatus 110 on the basis of the mobile object information shared with the other submersible vehicle 100, thereby controlling the direction of the optical axis 111 of the optical wireless communication apparatus 110.

Figure 6:
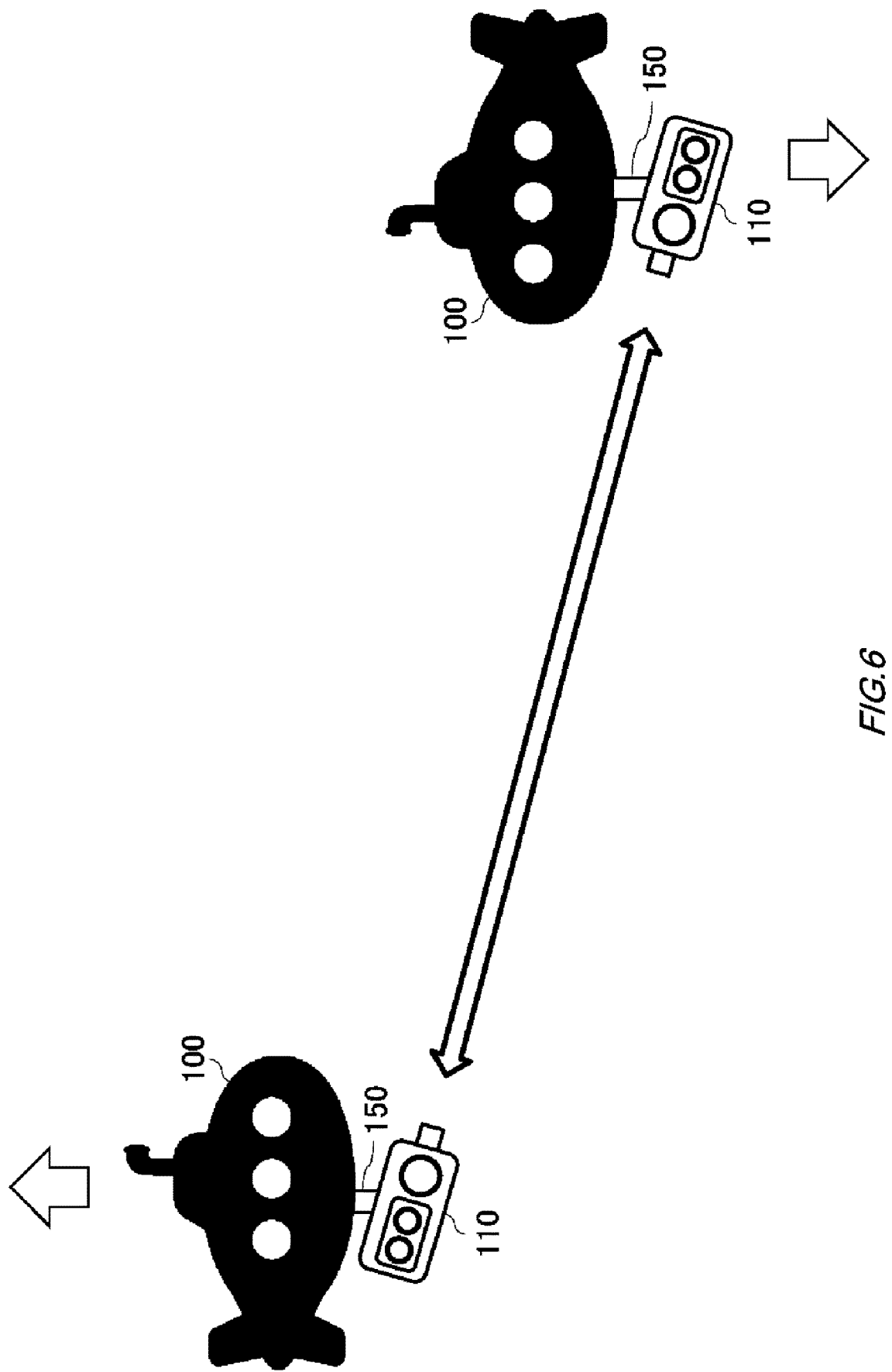
FIG. 6 is an explanatory diagram of control of the optical axis 111 by the submersible vehicle 100.

FIG. 6 is an explanatory diagram of control of the optical axis 111 by the submersible vehicle 100. Here, the points different from those in FIG. 2 will be mainly described.

The first submersible vehicle 100 controls the gimbal 150 to tilt the optical wireless communication apparatus 110 downward such that the direction of the optical axis 111 of the first submersible vehicle 100 faces the optical wireless communication apparatus 110 of the second submersible vehicle 100 so as to maintain the alignment of the optical axis 111 of the first submersible vehicle 100 and the optical axis 111 of the second submersible vehicle 100. The second submersible vehicle 100 controls the gimbal 150 to tilt the optical wireless communication apparatus 110 upward such that the direction of the optical axis 111 of the second submersible vehicle 100 faces the optical wireless communication apparatus 110 of the first submersible vehicle 100 so as to maintain the alignment of the optical axis 111 of the second submersible vehicle 100 and the optical axis 111 of the first submersible vehicle 100.

In this way, each of the first submersible vehicle 100 and the second submersible vehicle 100 controls the gimbal 150 on the basis of the shared mobile object information, and controls the direction of the optical axis 111 by changing the posture of the optical wireless communication apparatus 110, so that the alignment of the optical axes 111 can be maintained and the optical wireless communication can be executed stably. In particular, by sharing the body control information, it is possible to cope with the voluntary movement of the submersible vehicle 100, and by sharing the inertial measurement information, it is also possible to cope with the movement of the submersible vehicle 100 due to an external factor.

Figure 7:
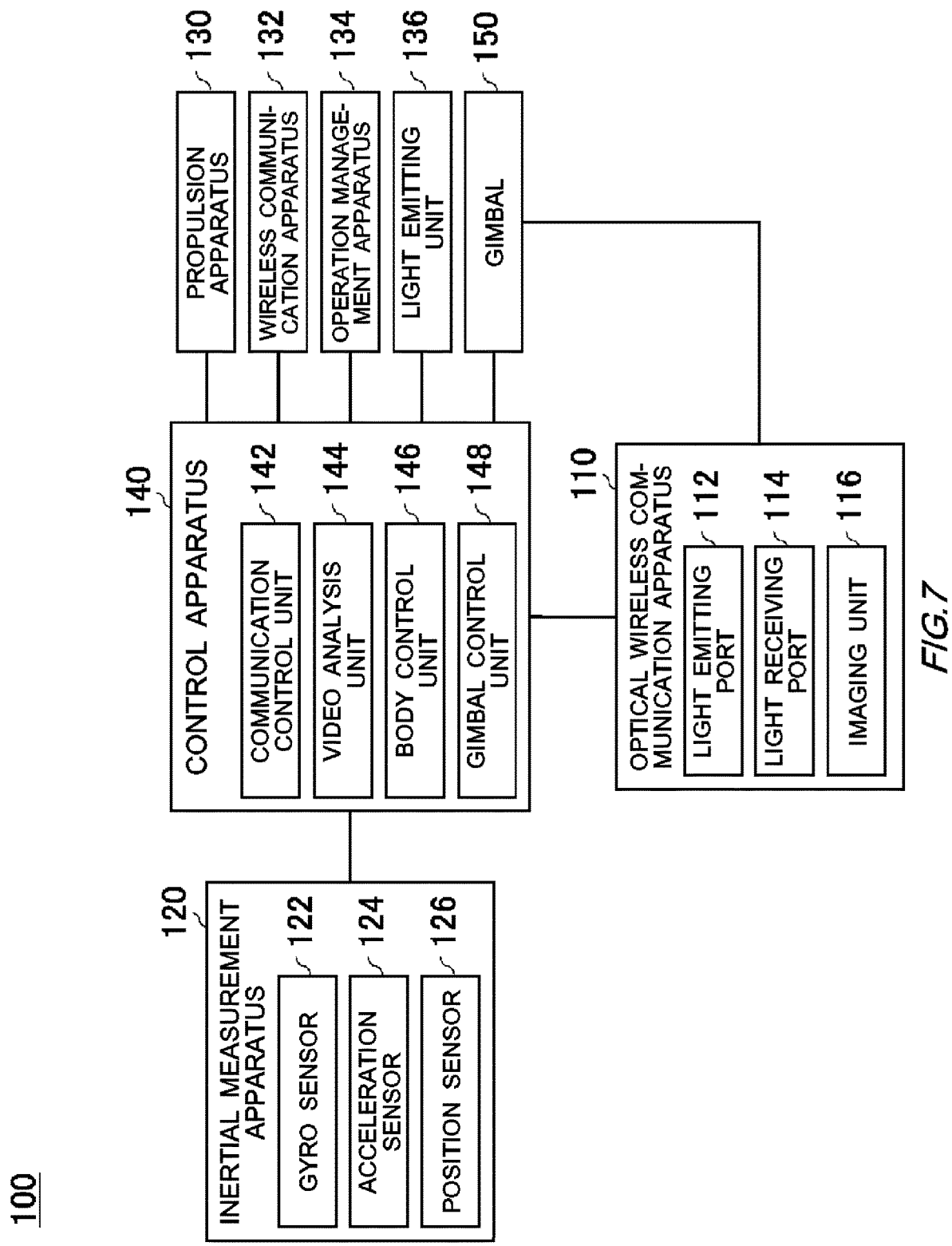
FIG. 7 schematically illustrates an example of the functional configuration of the submersible vehicle 100.

FIG. 7 schematically illustrates an example of the functional configuration of the submersible vehicle 100. Here, the points different from those in FIG. 3 will be mainly described. The submersible vehicle 100 illustrated in FIG. 7 is provided with the gimbal 150, and the control apparatus 140 includes a gimbal control unit 148.

The gimbal control unit 148 controls the gimbal 150 to adjust the angle of the optical wireless communication apparatus 110 on the basis of the own vehicle information and the other vehicle information such that the alignment of the optical axis 111 of the optical wireless communication apparatus 110 of the own vehicle and the optical axis 111 of the optical wireless communication apparatus 110 of the other vehicle is maintained. The gimbal control unit 148 may be an example of the optical axis direction control unit.

Figure 8:
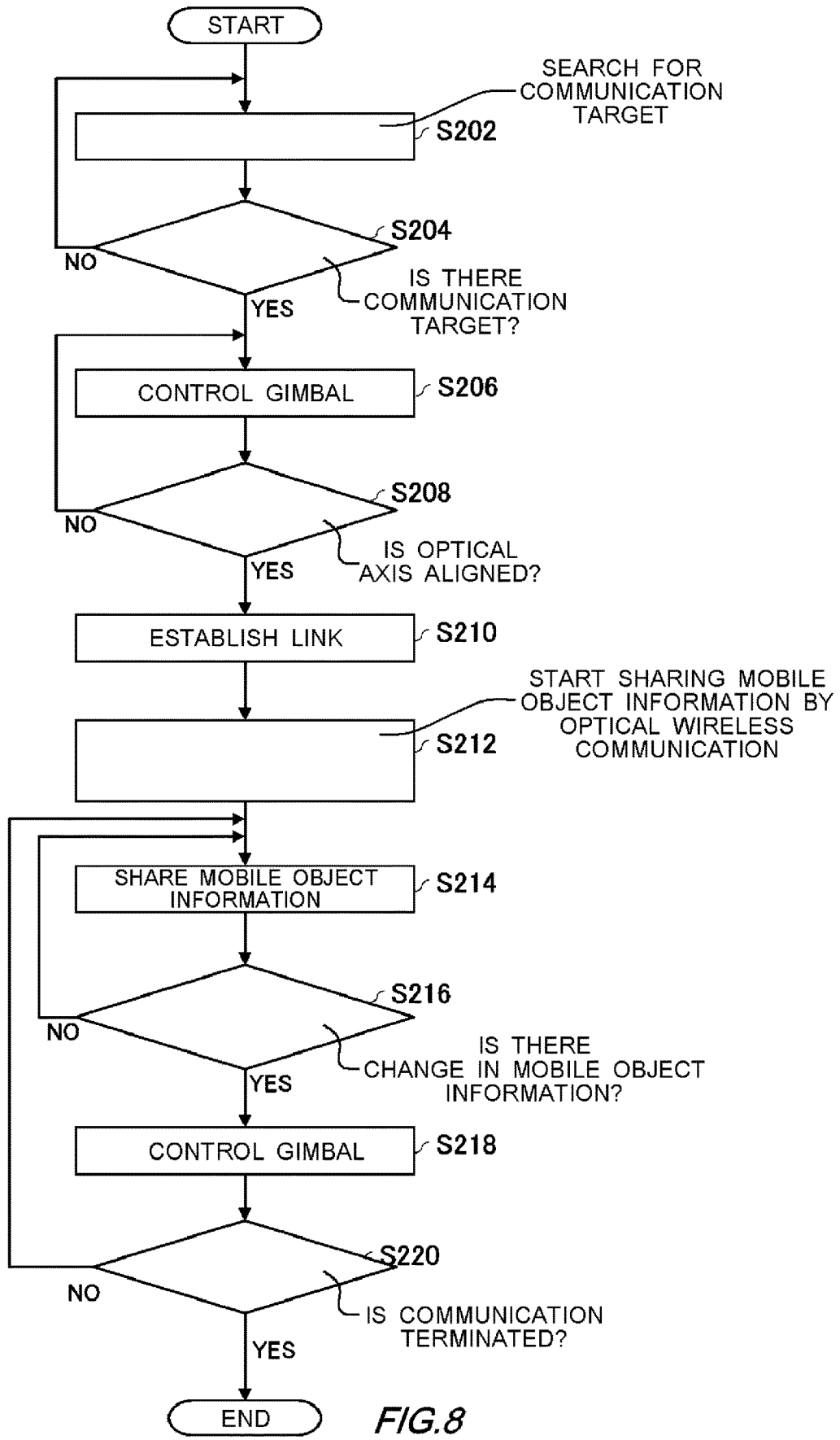
FIG. 8 schematically illustrates an example of a processing flow by the submersible vehicle 100.

FIG. 8 schematically illustrates an example of the processing flow by the submersible vehicle 100. Here, the points different from those in FIG. 4 will be mainly described.

In S202, the control apparatus 140 searches for a submersible vehicle 100 to be communicated. In a case where there is no communication target (NO in S204), the process returns to S202, and in a case where there is a communication target (YES in S204), the process proceeds to S206.

In S206, the gimbal control unit 148 controls the gimbal 150 such that the optical axis 111 of the own vehicle and the optical axis 111 of the other vehicle to be communicated are aligned. In a case where the optical axis 111 of the own vehicle and the optical axis 111 of the other vehicle are not aligned (NO in S208), the process returns to S206, and in a case where both are aligned (YES in S208), the process proceeds to S210.

In S210, the communication control unit 142 establishes the optical wireless communication link with the other vehicle. In S212, the communication control unit 142 starts sharing mobile object information with the other vehicle by optical wireless communication.

In S214, the communication control unit 142 shares the mobile object information. The communication control unit 142 transmits the own machine information to the other vehicle by optical wireless communication, and also receives the other vehicle information from the other vehicle. In S216, the gimbal control unit 148 determines whether there has been a change in the mobile object information. In a case where it is determined that there is no change, the process returns to S214, and in a case where it is determined that there is a change, the process proceeds to S218.

In S218, the gimbal control unit 148 controls the gimbal 150 in order to maintain the alignment of the optical axis 111 of the own vehicle and the optical axis 111 of the other vehicle on the basis of the own vehicle information and the other vehicle information. In S220, the communication control unit 142 determines whether to terminate the optical wireless communication with the other vehicle. In a case where it is determined not to terminate, the process returns to S214, and in a case where it is determined to terminate, the process is terminated.

Figure 9:
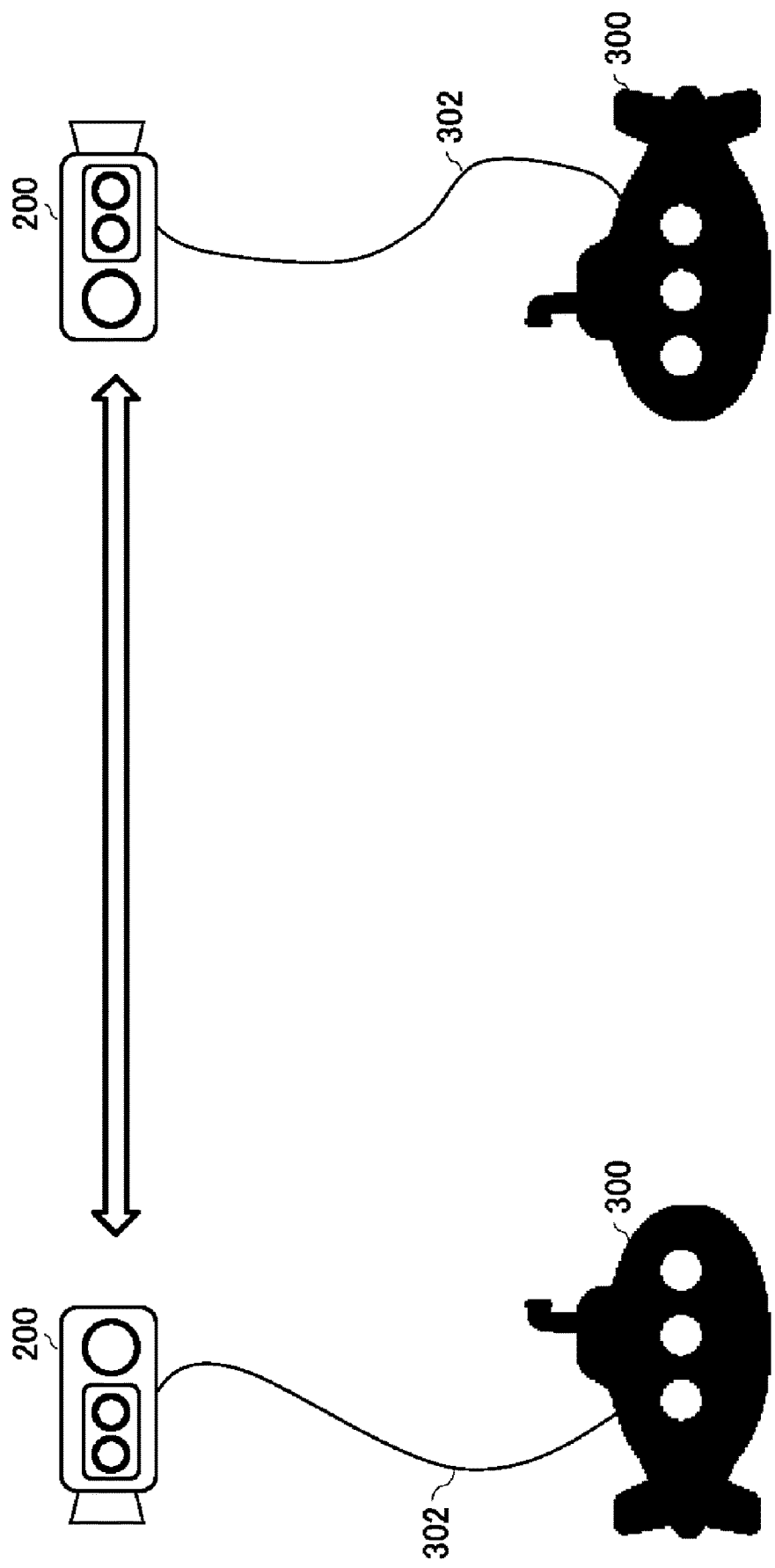
FIG. 9 schematically illustrates an example of a mobile communication apparatus 200.

FIG. 9 schematically illustrates an example of the mobile communication apparatus 200. The mobile communication apparatus 200 may be an example of the mobile object. In the example illustrated in FIG. 9, the mobile communication apparatus 200 is connected to a submersible vehicle 300 via a cable 302. The mobile communication apparatus 200 executes the optical wireless communication with another mobile communication apparatus 200, and relays the communication between the submersible vehicle 300 connected to the mobile communication apparatus 200 and the submersible vehicle 300 connected to the other mobile communication apparatus 200. The submersible vehicle 300 may be an example of a communication apparatus.

Figure 10:
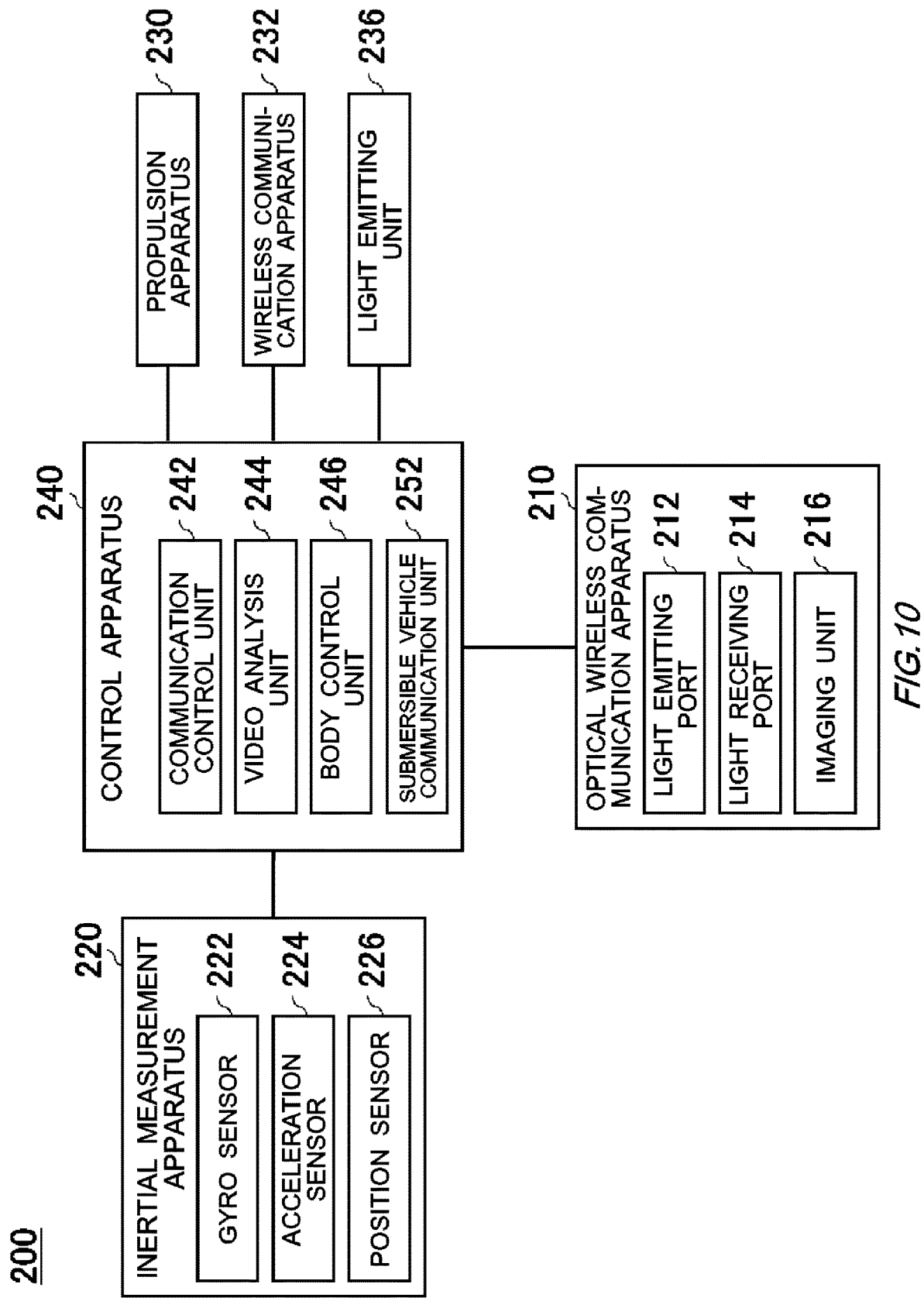
FIG. 10 schematically illustrates an example of the functional configuration of the mobile communication apparatus 200.

FIG. 10 schematically illustrates an example of the functional configuration of the mobile communication apparatus 200. The mobile communication apparatus 200 is provided with an optical wireless communication apparatus 210, an inertial measurement apparatus 220, a propulsion apparatus 230, a wireless communication apparatus 232, a light emitting unit 236, and a control apparatus 240. Note that it is not essential that the mobile communication apparatus 200 is provided with all of these configurations.

The optical wireless communication apparatus 210 includes a light emitting port 212, a light receiving port 214, and an imaging unit 216. The optical wireless communication apparatus 210 may be the same as the optical wireless communication apparatus 110.

The inertial measurement apparatus 220 performs measurement of the behavior of the body of the mobile communication apparatus 200. The inertial measurement apparatus 220 includes a gyro sensor 222, an acceleration sensor 224, and a position sensor 226. The inertial measurement apparatus 220 may be the same as the inertial measurement apparatus 120.

The propulsion apparatus 230 propels the mobile communication apparatus 200. The propulsion apparatus 230 may be the same as the propulsion apparatus 130.

The wireless communication apparatus 232 communicates wirelessly with the other mobile communication apparatus 200 in a place other than underwater. The wireless communication apparatus 232 may be the same as the wireless communication apparatus 132.

The light emitting unit 236 outputs light having a directivity lower than the directivity of the light output from the light emitting port 212. The light emitting unit 236 may be the same as the light emitting unit 136.

The control apparatus 240 controls each part of the mobile communication apparatus 200. The control apparatus 240 includes a communication control unit 242, a video analysis unit 244, a body control unit 246, and a submersible vehicle communication unit 252.

The communication control unit 242 may be the same as the communication control unit 142. The video analysis unit 244 may be the same as the video analysis unit 144. The body control unit 246 may be the same as the body control unit 146.

The submersible vehicle communication unit 252 communicates with the submersible vehicle 300 via the cable 302. The submersible vehicle communication unit 252 may transmit the data received from the submersible vehicle 300 via the cable 302 to the other mobile communication apparatus 200 by optical wireless communication by the optical wireless communication apparatus 210 via the communication control unit 242. The other mobile communication apparatus 200 may transmit the received data to the submersible vehicle 300 connected to itself via the cable 302.

The other mobile communication apparatus 200 may transmit the data received from the submersible vehicle 300 connected to itself via the cable 302 to the mobile communication apparatus 200 by optical wireless communication. The submersible vehicle communication unit 252 may transmit the data received from the other mobile communication apparatus 200 by optical wireless communication by the optical wireless communication apparatus 210 to the submersible vehicle 300 connected to itself via the cable 302. The submersible vehicle communication unit 252 may be an example of a communication relay unit.

In FIG. 9 and FIG. 10, the case where the mobile communication apparatus 200 is connected to the submersible vehicle 100 has been given as an example, but the present invention is not limited to this. The mobile communication apparatus 200 may be connected to any communication apparatus. For example, the mobile communication apparatus 200 may have flight capability and be connected to a flying object such as an unmanned aerial vehicle and a helicopter, an automobile, a ship, a wireless base station, and the like.

Figure 11:
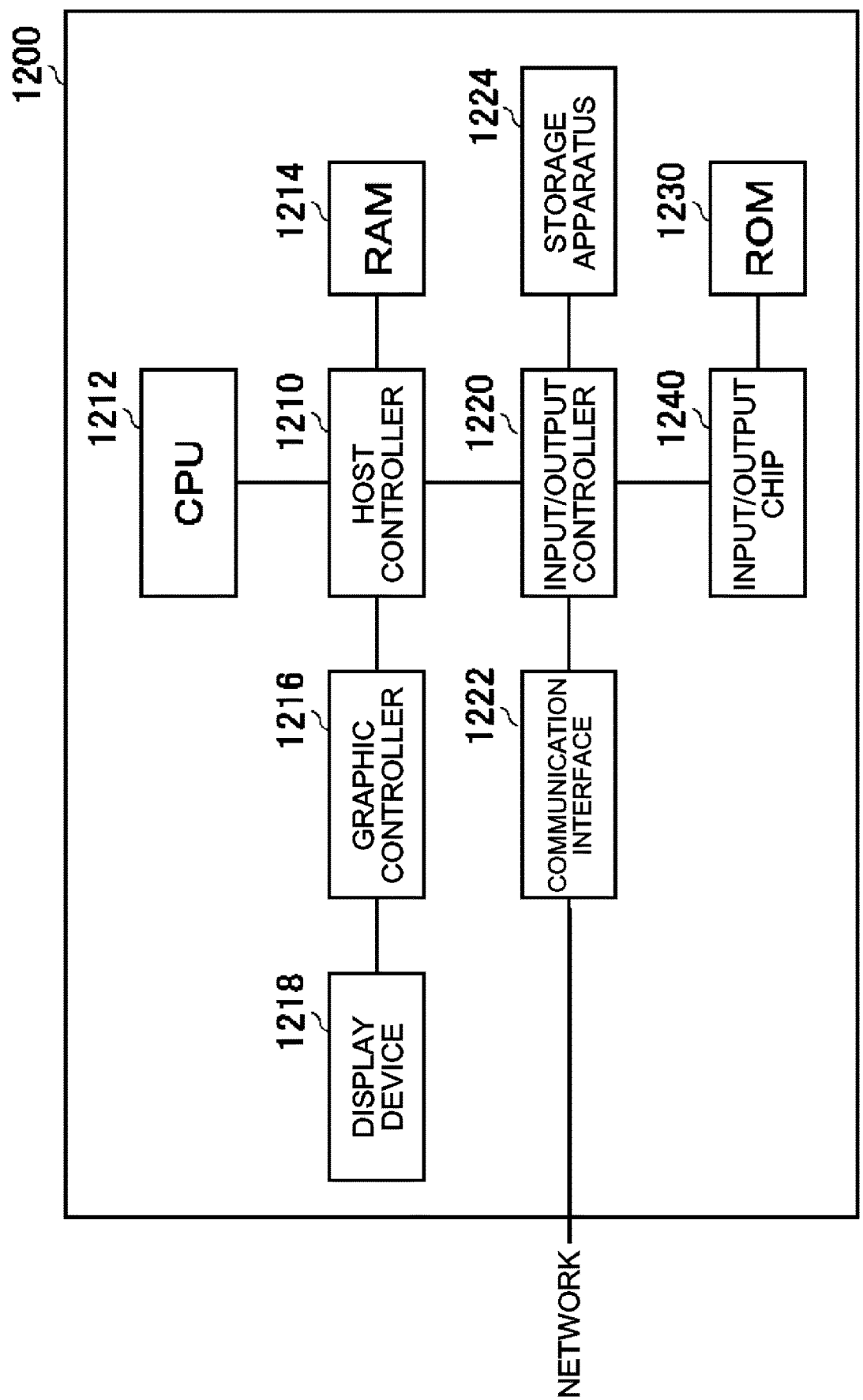
FIG. 11 schematically illustrates an example of a hardware configuration of a computer 1200 that functions as a control apparatus 140 or a control apparatus 240.

FIG. 11 schematically illustrates an example of a hardware configuration of a computer 1200 that functions as the control apparatus 140 or the control apparatus 240. A program installed in the computer 1200 can cause the computer 1200 to function as one or more "units" of the apparatus according to the present embodiment, or cause the computer 1200 to perform an operation or the one or more "units" associated with the apparatus according to the present embodiment, and/or cause the computer 1200 to execute a process or a step of the process associated to the present embodiment. Such programs may be executed by a CPU 1212 to cause the computer 1200 to perform certain operations associated with some or all of the blocks in the flowcharts and block diagrams described in the present specification.

The computer 1200 according to the present embodiment includes the CPU 1212, a RAM 1214, and a graphic controller 1216, which are interconnected by a host controller 1210. The computer 1200 further includes input/output units such as a communication interface 1222, a storage apparatus 1224, and an IC card drive, which are connected to the host controller 1210 via an input/output controller 1220. The storage apparatus 1224 may be a hard disk drive, a solid state drive, or the like. The computer 1200 further includes legacy input/output units such as a ROM 1230 and a keyboard, which are connected to the input/output controller 1220 via an input/output chip 1240.

The CPU 1212 operates according to programs stored in the ROM 1230 and the RAM 1214, thereby controlling each unit. The graphics controller 1216 acquires image data generated by the CPU 1212 in a frame buffer or the like provided in the RAM 1214 or in itself, such that the image data is displayed on a display device 1218.

The communication interface 1222 communicates with other electronic devices via a network. The storage apparatus 1224 stores programs and data used by the CPU 1212 in the computer 1200. The IC card drive reads programs and data from the IC card and/or writes the programs and data to the IC card.

The ROM 1230 stores therein a boot program executed by the computer 1200 at the time of activation and/or a program dependent on hardware of the computer 1200. The input/output chip 1240 may further connect various input/output units to the input/output controller 1220 via a USB port, a parallel port, a serial port, a keyboard port, a mouse port, or the like.

The program is provided by a computer-readable storage medium such as an IC card. The program is read from the computer-readable storage medium, installed in the storage apparatus 1224, the RAM 1214, or the ROM 1230, which are also an example of the computer-readable storage medium, and executed by the CPU 1212. The information processing described in these programs is read by the computer 1200 and provides cooperation between the programs and various types of hardware resources. The apparatus or method may be configured by implementing operation or processing of information according to the use of the computer 1200.

For example, in a case where communication is performed between the computer 1200 and an external device, the CPU 1212 may execute a communication program loaded in the RAM 1214 and instruct the communication interface 1222 to perform communication processing on the basis of a process described in the communication program. Under the control of the CPU 1212, the communication interface 1222 reads transmission data stored in a transmission buffer area provided in a recording medium such as the RAM 1214, the storage apparatus 1224, or the IC card, transmits the read transmission data to the network, or writes reception data received from the network in a reception buffer area or the like provided on the recording medium.

In addition, the CPU 1212 may cause all or a necessary portion of a file or a database stored in an external recording medium such as the storage apparatus 1224 or the IC card to be read by the RAM 1214, and may execute various types of processing on data on the RAM 1214. Next, the CPU 1212 may write back the processed data to the external recording medium.

Various types of information such as various types of programs, data, tables, and databases may be stored in a recording medium and subjected to information processing. The CPU 1212 may execute various types of processing on the data read from the RAM 1214, including various types of operations, information processing, conditional determination, conditional branching, unconditional branching, information retrieval/replacement, and the like, which are described throughout the present disclosure and specified by a command sequence of a program, and writes back the results to the RAM 1214. In addition, the CPU 1212 may retrieve information in a file, a database, or the like in the recording medium. For example, in a case where a plurality of entries each having the attribute value of a first attribute associated with the attribute value of a second attribute is stored in the recording medium, the CPU 1212 may retrieve an entry matching the condition in which the attribute value of the first attribute is specified from among the plurality of entries, read the attribute value of the second attribute stored in the entry, and thereby acquire the attribute value of the second attribute associated with the first attribute satisfying the predetermined condition.

The programs or software modules described above may be stored in a computer-readable storage medium on or near the computer 1200. In addition, a recording medium such as a hard disk or a RAM provided in a server system connected to a dedicated communication network or the Internet can be used as a computer-readable storage medium, thereby providing a program to the computer 1200 via the network.

The blocks in the flowcharts and block diagrams of the present embodiment may represent the stage of the process in which the operation is executed or the "unit" of the apparatus responsible for executing the operation. Certain stages and "units" may be implemented by dedicated circuitry, programmable circuitry provided with computer-readable instructions stored on a computer-readable storage medium, and/or a processor provided with computer-readable instructions stored on a computer-readable storage medium. Dedicated circuitry may include digital and/or analog hardware circuitry and may include integrated circuitry (IC) and/or discrete circuitry. The programmable circuitry may include, for example, a reconfigurable hardware circuitry including logical AND, logical OR, exclusive OR, NAND, NOR, and other logical operations, flip-flops, registers, and memory elements, such as a field programmable gate array (FPGA) and a programmable logic array (PLA).

The computer-readable storage medium may include any tangible device capable of storing instructions for execution by a suitable device, so that the computer-readable storage medium having the instructions stored therein will have a product including instructions that can be executed to create means for performing the operations specified in flowcharts or block diagrams. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

The computer-readable instructions may include either source code or object code written in any combination of one or more programming languages, including assembler instructions, instruction-set-architecture (ISA) instructions, machine instructions, machine-dependent instructions, microcode, firmware instructions, state-setting data, or an object oriented programming language such as Smalltalk (registered trademark), JAVA (registered trademark), C++, or the like, and conventional procedural programming languages, such as the "C" programming language or similar programming languages.

The computer-readable instructions may be provided to a general-purpose computer, a special-purpose computer, or a processor or a programmable circuit of other programmable data processing apparatus locally or via a local area network (LAN) or a wide area network (WAN) such as the Internet in order for the general-purpose computer, the special-purpose computer, or the processor or the programmable circuit of other programmable data processing apparatus to execute the computer-readable instructions for generating a means for executing the operation indicated in the flowchart or the block diagram. Examples of the processor include a computer processor, a processing unit, a microprocessor, a digital signal processor, a controller, a microcontroller, and the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

100: submersible vehicle
110: optical wireless communication apparatus
111: optical axis
112: light emitting port
114: light receiving port
116: imaging unit
120: inertial measurement apparatus
122: gyro sensor
124: acceleration sensor
126: position sensor
130: propulsion apparatus
132: wireless communication apparatus
134: operation management apparatus
136: light emitting unit
140: control apparatus
142: communication control unit
144: video analysis unit
146: body control unit
148: gimbal control unit
150: gimbal
200: mobile communication apparatus
210: optical wireless communication apparatus
212: light emitting port
214: light receiving port
216: imaging unit
220: inertial measurement apparatus
222: gyro sensor
224: acceleration sensor
226: position sensor
230: propulsion apparatus
232: wireless communication apparatus
236: light emitting unit
240: control apparatus
242: communication control unit
244: video analysis unit
246: body control unit
252: submersible vehicle communication unit
1200: computer
1210: host controller
1212: CPU
1214: RAM
1216: graphic controller
1218: display device
1220: input/output controller
1222: communication interface
1224: storage apparatus
1230: ROM
1240: input/output chip

What is claimed is:

1. A mobile object comprising:
a mobile object information transmitting unit configured to transmit, to another mobile object by optical wireless communication by a first optical wireless communication unit, first mobile object information including first inertial measurement information indicating measurement results of a three-dimensional angular velocity and an acceleration of the mobile object and first body control information used by a propulsion unit for propelling the mobile object according to the first body control information;
a mobile object information receiving unit configured to receive, from the another mobile object by optical wireless communication by the first optical wireless communication unit, second mobile object information including second inertial measurement information indicating measurement results of a three-dimensional angular velocity and an acceleration of the another mobile object and second body control information used by a propulsion unit for propelling the another mobile object according to the second body control information; and
an optical axis direction control unit configured to control a direction of an optical axis of the first optical wireless communication unit on a basis of the first mobile object information and the second mobile object information.

2. The mobile object according to claim 1, wherein
the optical axis direction control unit controls the direction of the optical axis of the first optical wireless communication unit such that an alignment of the optical axis of the first optical wireless communication unit and an optical axis of a second optical wireless communication unit of the another mobile object is maintained.

3. The mobile object according to claim 1, wherein
the mobile object information transmitting unit transmits the first mobile object information further including position information of the mobile object to the another mobile object, and
the mobile object information receiving unit receives the second mobile object information further including position information of the another mobile object from the another mobile object.

4. The mobile object according to claim 2, wherein
the mobile object information transmitting unit transmits the first mobile object information further including position information of the mobile object to the another mobile object, and the mobile object information receiving unit receives the second mobile object information further including position information of the another mobile object from the another mobile object.

5. The mobile object according to claim 1, comprising:
a movement plan control unit configured to control the propulsion unit on a basis of first movement plan information including a movement route of the mobile object, wherein
the mobile object information transmitting unit transmits the first mobile object information further including the first movement plan information to the another mobile object, and
the mobile object information receiving unit receives the second mobile object information further including second movement plan information including a movement route of the another mobile object.

6. The mobile object according to claim 2, comprising:
a movement plan control unit configured to control the propulsion unit on a basis of first movement plan information including a movement route of the mobile object, wherein
the mobile object information transmitting unit transmits the first mobile object information further including the first movement plan information to the another mobile object, and
the mobile object information receiving unit receives the second mobile object information further including second movement plan information including a movement route of the another mobile object.

7. The mobile object according to claim 5, wherein
while predicting a change in a relative position between the mobile object and the another mobile object on a basis of the first movement plan information and the second movement plan information and controlling the direction of the optical axis of the first optical wireless communication unit on a basis of a prediction result, the optical axis direction control unit executes control of the direction of the optical axis of the first optical wireless communication unit on a basis of the first inertial measurement information, the first body control information, the second inertial measurement information, and the second body control information, finer than control of the direction of the optical axis of the first optical wireless communication unit based on the prediction result.

8. The mobile object according to claim 1, wherein
the first optical wireless communication unit is fixed so as not to move relative to the mobile object, and
the optical axis direction control unit controls the propulsion unit to propel the mobile object such that the optical axis of the first optical wireless communication unit and an optical axis of a second optical wireless communication unit of the another mobile object are aligned with each other.

9. The mobile object according to claim 2, wherein
the first optical wireless communication unit is fixed so as not to move relative to the mobile object, and
the optical axis direction control unit controls the propulsion unit to propel the mobile object such that the optical axis of the first optical wireless communication unit and an optical axis of a second optical wireless communication unit of the another mobile object are aligned with each other.

10. The mobile object according to claim 1, comprising:
a gimbal configured to rotatably support the first optical wireless communication unit, wherein
the optical axis direction control unit controls the gimbal to adjust an angle of the first optical wireless communication unit such that an alignment of the optical axis of the first optical wireless communication unit and an optical axis of a second optical wireless communication unit of the another mobile object is maintained.

11. The mobile object according to claim 2, comprising:
a gimbal configured to rotatably support the first optical wireless communication unit, wherein
the optical axis direction control unit controls the gimbal to adjust an angle of the first optical wireless communication unit such that an alignment of the optical axis of the first optical wireless communication unit and an optical axis of a second optical wireless communication unit of the another mobile object is maintained.

12. The mobile object according to claim 1, wherein
the mobile object is an underwater mobile object that moves in water.

13. The mobile object according to claim 2, wherein
the mobile object is an underwater mobile object that moves in water.

14. The mobile object according to claim 12, wherein
the mobile object information transmitting unit transmits the first mobile object information further including water pressure information regarding a water pressure measured by a pressure gauge installed in the mobile object to the another mobile object, and
the mobile object information receiving unit receives the second mobile object information further including water pressure information regarding a water pressure measured by a pressure gauge installed in the another mobile object from the another mobile object.

15. The mobile object according to claim 12, wherein
the mobile object information transmitting unit transmits the first mobile object information further including flow rate information regarding a flow rate measured by a flow meter installed in the mobile object to the another mobile object, and
the mobile object information receiving unit receives the second mobile object information further including flow rate information regarding a flow rate measured by a flow meter installed in the another mobile object from the another mobile object.

16. The mobile object according to claim 12,
wherein the mobile object is connected to a submersible vehicle via a cable,
comprising:
a communication relay unit configured to transmit data received from the submersible vehicle via the cable to the another mobile object by optical wireless communication by the first optical wireless communication unit, and transmit data received from the another mobile object by optical wireless communication by the first optical wireless communication unit to the submersible vehicle via the cable.

17. The mobile object according to claim 1, wherein
the mobile object is an unmanned aerial vehicle.

18. The mobile object according to claim 17,
wherein the mobile object is connected to a communication apparatus via a cable,
comprising:
a communication relay unit configured to transmit data received from the communication apparatus via the cable to the another mobile object by optical wireless communication by the first optical wireless communication unit, and transmit data received from the another mobile object by optical wireless communication by the first optical wireless communication unit to the communication apparatus via the cable.

19. A non-transitory computer-readable storage medium having stored therein a program for causing a computer for controlling a mobile object to function as:
- a mobile object information transmitting unit configured to transmit, to another mobile object by optical wireless communication by a first optical wireless communication unit, first mobile object information including first inertial measurement information indicating measurement results of a three-dimensional angular velocity and an acceleration of the mobile object and first body control information used by a propulsion unit for propelling the mobile object according to the first body control information;
- a mobile object information receiving unit configured to receive, from the another mobile object by optical wireless communication by the first optical wireless communication unit, second mobile object information including second inertial measurement information indicating measurement results of a three-dimensional angular velocity and an acceleration of the another mobile object and second body control information used by a propulsion unit for propelling the another mobile object according to the second body control information; and
- an optical axis direction control unit configured to control a direction of an optical axis of the first optical wireless communication unit on a basis of the first mobile object information and the second mobile object information.

20. A control method executed by a computer equipped in a mobile object, comprising:
- transmitting mobile object information by transmitting, to another mobile object by optical wireless communication by a first optical wireless communication unit, first mobile object information including first inertial measurement information indicating measurement results of a three-dimensional angular velocity and an acceleration of the mobile object and first body control information used by a propulsion unit for propelling the mobile object according to the first body control information;
- receiving mobile object information by receiving, from the another mobile object by optical wireless communication by the first optical wireless communication unit, second mobile object information including second inertial measurement information indicating measurement results of a three-dimensional angular velocity and an acceleration of the another mobile object and second body control information used by a propulsion unit for propelling the another mobile object according to the second body control information; and
- controlling a direction of an optical axis of the first optical wireless communication unit on a basis of the first mobile object information and the second mobile object information.

* * * * *